(12) United States Patent
Li (10) Patent No.: US 10,864,860 B2
(45) Date of Patent: Dec. 15, 2020

(54) MODEL-BASED METHOD FOR 360 DEGREE SURROUND VIEW USING CAMERAS AND RADARS MOUNTED AROUND A VEHICLE

(71) Applicant: Black Sesame International Holding Limited, Santa Clara, CA (US)

(72) Inventor: Jin Li, San Jose, CA (US)

(73) Assignee: Black Sesame International Holding Limited, Santa Clara, CA (US)

( * ) Notice: Subject to any disclaimer, the term of this patent is extended or adjusted under 35 U.S.C. 154(b) by 48 days.

(21) Appl. No.: 16/044,203

(22) Filed: Jul. 24, 2018

(65) Prior Publication Data

US 2020/0031291 A1 Jan. 30, 2020

(51) Int. Cl.
| | |
|---|---|
| *B60R 1/00* | (2006.01) |
| *G01S 13/87* | (2006.01) |
| *G01S 13/89* | (2006.01) |
| *G01S 13/86* | (2006.01) |
| *G01S 13/93* | (2020.01) |
| *G06T 3/40* | (2006.01) |
| *H04N 5/00* | (2011.01) |
| *H04N 7/18* | (2006.01) |
| *B60R 11/04* | (2006.01) |
| *H04N 5/225* | (2006.01) |
| *G01S 13/931* | (2020.01) |
| *H04N 5/232* | (2006.01) |

(52) U.S. Cl.
CPC ............ *B60R 11/04* (2013.01); *G01S 13/931* (2013.01); *G06T 3/4038* (2013.01); *H04N 5/2253* (2013.01); *H04N 5/23238* (2013.01)

(58) Field of Classification Search
CPC ..... B60R 11/04; G01S 13/931; G06T 3/4038; H04N 5/2253; H04N 5/23238
USPC .......................................................... 348/148
See application file for complete search history.

(56) References Cited

U.S. PATENT DOCUMENTS

| | | | |
|---|---|---|---|
| 2014/0278065 A1* | 9/2014 | Ren ......................... | G06T 15/04 701/454 |
| 2016/0191795 A1* | 6/2016 | Han ....................... | G06T 3/4038 348/36 |

* cited by examiner

*Primary Examiner* — Patricia I Young
(74) *Attorney, Agent, or Firm* — Timothy T. Wang; Ni, Wang & Massand, PLLC (57) ABSTRACT

A method of stitching panoramic optical images around a vehicle having, receiving a plurality of optical images from a plurality of image sensors mounted on the vehicle of a plurality of objects surrounding the vehicle, overlapping optical images of the plurality of objects surrounding the vehicle, identifying seams between the plurality of objects surrounding the vehicle within the plurality of optical images, receiving a plurality of radar images from a plurality of radar sensors mounted on the vehicle indicating at least one direction and at least one distance of at least one of the plurality objects surrounding the vehicle, linking the plurality of optical images of the plurality of objects surrounding the its vehicle to the plurality of radar images and stitching the plurality of optical images based on the plurality of radar images.

15 Claims, 8 Drawing Sheets

MODEL-BASED METHOD FOR 360 DEGREE SURROUND VIEW USING CAMERAS AND RADARS MOUNTED AROUND A VEHICLE

BACKGROUND

Technical Field

The instant disclosure may be applicable to advanced driver assistance system and the like.

Background

Currently, automotive surround view assists a driver in traffic or for parking a vehicle safely and may be used for the slow maneuvering of the vehicle and radars and cameras are utilized separately in collision avoidance.

SUMMARY

In one embodiment a method of stitching panoramic optical images around a vehicle having, receiving a plurality of optical images from a plurality of image sensors mounted on the vehicle of a plurality of objects surrounding the vehicle, overlapping optical images of the plurality of objects surrounding the vehicle, identifying seams between the plurality of objects surrounding the vehicle within the plurality of optical images, receiving a plurality of radar images from a plurality of radar sensors mounted on the vehicle indicating at least one direction and at least one distance of at least one of the plurality objects surrounding the vehicle, linking the plurality of optical images of the plurality of objects surrounding the vehicle to the plurality of radar images and stitching the plurality of optical images based on the plurality of radar images.

In another embodiment a method of stitching a 360 degree optical image having, receiving a plurality of optical images of a plurality of surrounding objects, wherein the plurality of optical images comprises the 360 degree optical image, overlapping optical images of the plurality of surrounding objects within the plurality of optical images, identifying seams between the plurality of surrounding objects within the plurality of optical images, receiving a plurality of radar images indicating at least one direction and at least one distance of at least one of the plurality surrounding objects, linking the plurality of optical images of the plurality of surrounding objects to the plurality of radar images and stitching the plurality of optical images based on the plurality of radar images.

In yet another embodiment a method of stitching panoramic optical images having, receiving a plurality of optical images of a plurality of surrounding objects, wherein the plurality of optical images comprises a panoramic image, overlapping optical images of the plurality of surrounding objects within the plurality of optical images, identifying seams between the plurality of surrounding objects within the plurality of optical images, receiving a plurality of radar images indicating at least one direction and at least one distance of at least one of the plurality surrounding objects, linking the plurality of optical images of the plurality of surrounding objects to the plurality of radar images and stitching the plurality of optical images based on the plurality of radar images.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope of the claims.

Certain terms are used throughout the following description and claims to refer to particular system components. As one skilled in the art will appreciate, different companies may refer to a component and or method by different names. This document does not intend to distinguish between components and/or methods that differ in name but, not in function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device that connection may be through a direct connection or through an indirect connection via other devices and connections.

Figure 1:
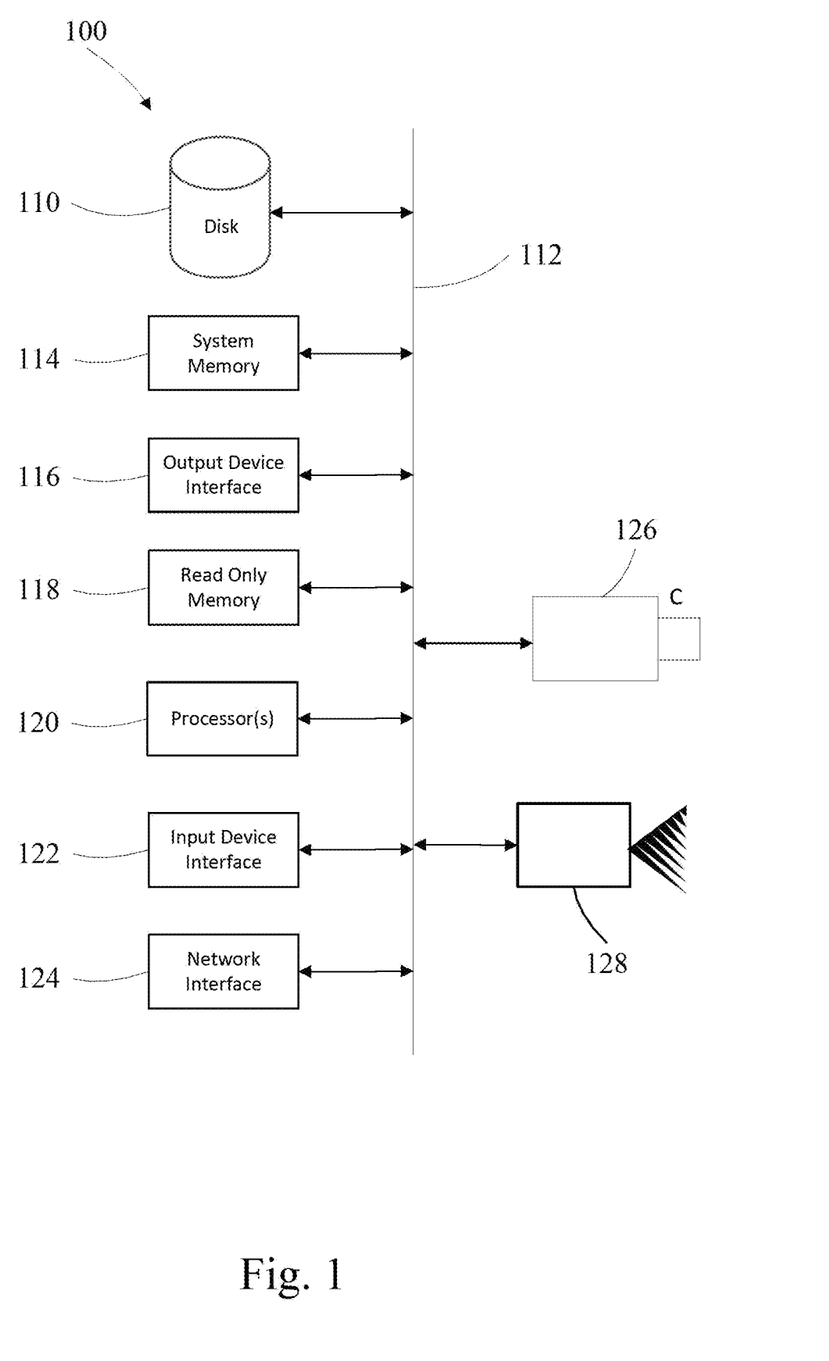
FIG. 1 is a system diagram in accordance with one embodiment of the disclosure.

FIG. 1 depicts an example electronic system for use in connection with a vehicle. Electronic system 100 may be a computing device for execution of software associated with the operation of one or more portions or steps of process 500, 600, 700 or 800, or components and processes provided by FIGS. 5-8. Electronic system 100 may be a car based embedded computer, an embedded computer, personal computer or a mobile device such as a tablet computer, laptop, smart phone, PDA, or other touch screen or television with one or more processors embedded therein or coupled thereto, or any other sort of computer-related electronic device having wireless connectivity.

Electronic system 100 may include various types of computer readable media and interfaces for various other types of computer readable media. In the depicted example, electronic system 100 includes a bus 112, processor(s) 120, a system memory 114, a read-only memory (ROM) 118, a permanent storage device 110, an input device interface 122, an output device interface 116, and one or more network interfaces 124. In some implementations, electronic system 100 may include or be integrated with other computing devices or circuitry for operation of the various components and processes previously described. In one embodiment of the present disclosure the processor(s) 120 is coupled through the bus 112 to the optical sensor 126 (i.e. camera) and the radar 128.

Bus 112 collectively represents all system, peripheral, and chipset buses that communicatively connect the numerous internal devices of electronic system 100. For instance, bus 112 communicatively connects processor(s) 120 with ROM 118, system memory 114, permanent storage device 110, optical sensor 126 (i.e. camera) and radar 128.

From these various memory units, processor(s) 120 retrieves instructions to execute and data to process in order to execute the processes of the subject disclosure. The processing unit(s) can be a single processor or a multi-core processor in different implementations.

ROM 118 stores static data and instructions that are needed by processor(s) 120 and other modules of the electronic system. Permanent storage device 110, on the other hand, is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 114 is a read-and-write memory device. However, unlike permanent storage device 110, system memory 114 is a volatile read-and-write memory, such a random access memory. System memory 114 stores some of the instructions and data that the processor needs at runtime. In some implementations, the processes of the subject disclosure are stored in system memory 114, permanent storage device 110, and/or ROM 118. From these various memory units, processor(s) 120 retrieves instructions to execute and data to process in order to execute the processes of some implementations.

Bus 112 also connects to input and output device interfaces 122 and 116. Input device interface 122 enables the user to communicate information and select commands to the electronic system input devices used with input device interface 122 include, for example, alphanumeric keyboards and pointing devices (also called "cursor control devices"). Output device interfaces 116 enables, for example, the display of images generated by the electronic system 100. Output devices used with output device interface 110 include, for example, printers and display devices, such as cathode ray tubes (CRT) or liquid crystal displays (LCD). Some implementations include devices such as a touchscreen that functions as both input and output devices.

Finally, as shown in FIG. 1, bus 112 also couples electronic system 100 to a network (not shown) through network interfaces 124. Network interfaces 124 may include, for example, a wireless access point (e.g., Bluetooth car WiFi) or radio circuitry for connecting to a wireless access point. Network interfaces 124 may also include hardware (e.g., Ethernet hardware) for connecting the computer to a part of a network of computers such as a local area network ("LAN"), a wide area network ("WAN"), wireless LAN, or an Intranet, or a network of networks, such as the Internet.

Any or all components of electronic system 100 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification cart be implemented in a computing system that includes a hack end component, e.g., as a data server, or that includes a middleware component, an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. Data generated at the client device (e.g., a result of the user interaction) can be received from the client device at the server.

Figure 2:
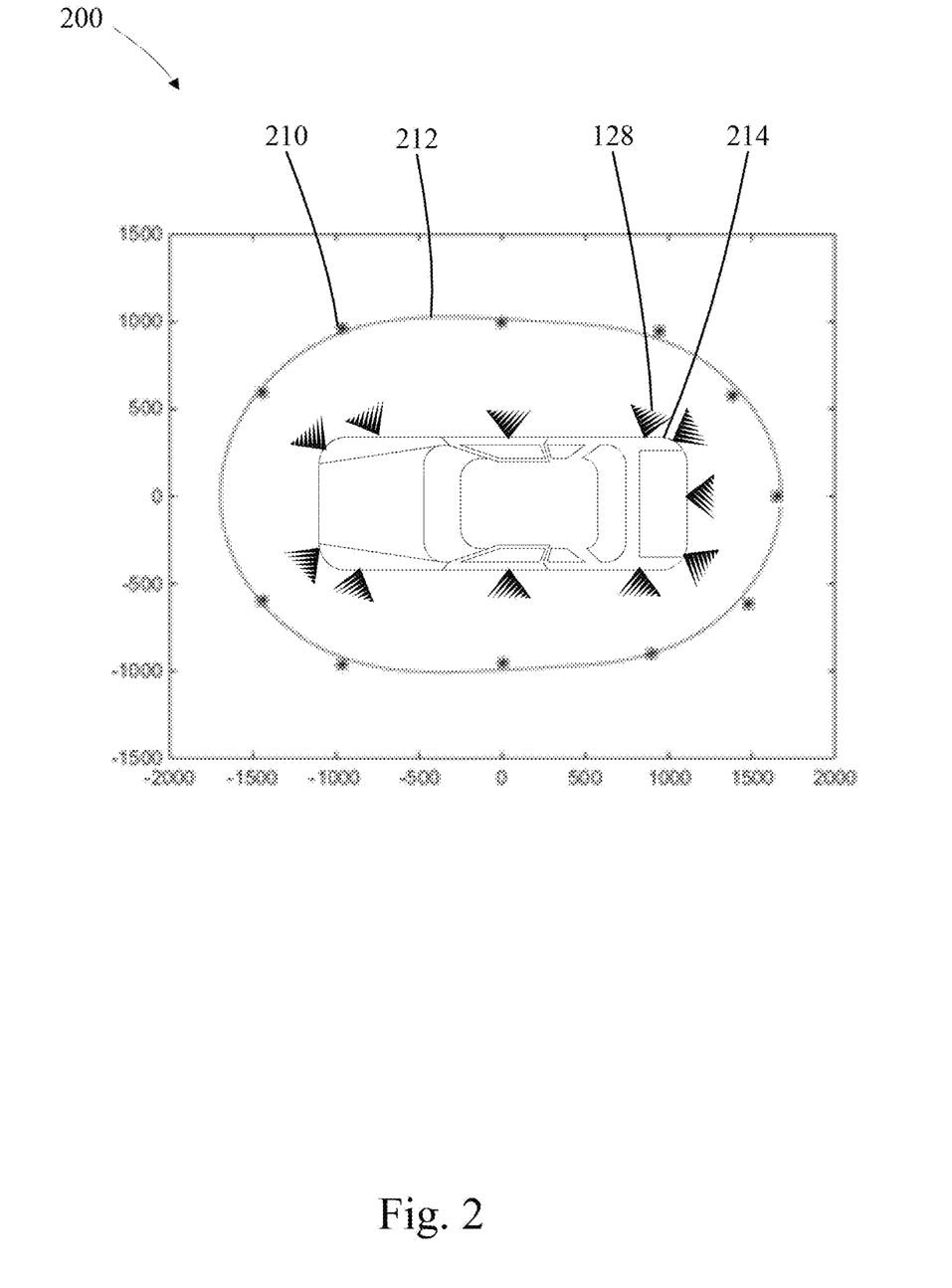
FIG. 2 is a two dimensional radar curve fit in accordance with one embodiment of the disclosure.

FIG. 2 depicts an example of the two dimensional (2D) curve fitted with B-splines 200, where blue the *'s 210 denote the sparse radar data from the radars 128 and curve fit 212 (line) denotes the 2D curve. The xy-center of the vehicle 214 is at (0,0). In this depiction the radar imaging data from the radars 128, i.e. distance from the vehicle 214 is taken and a 2D curve is fit to encompass the distances from the vehicle to the various objects detected by the radar FIG. 1 128.

Figure 3:
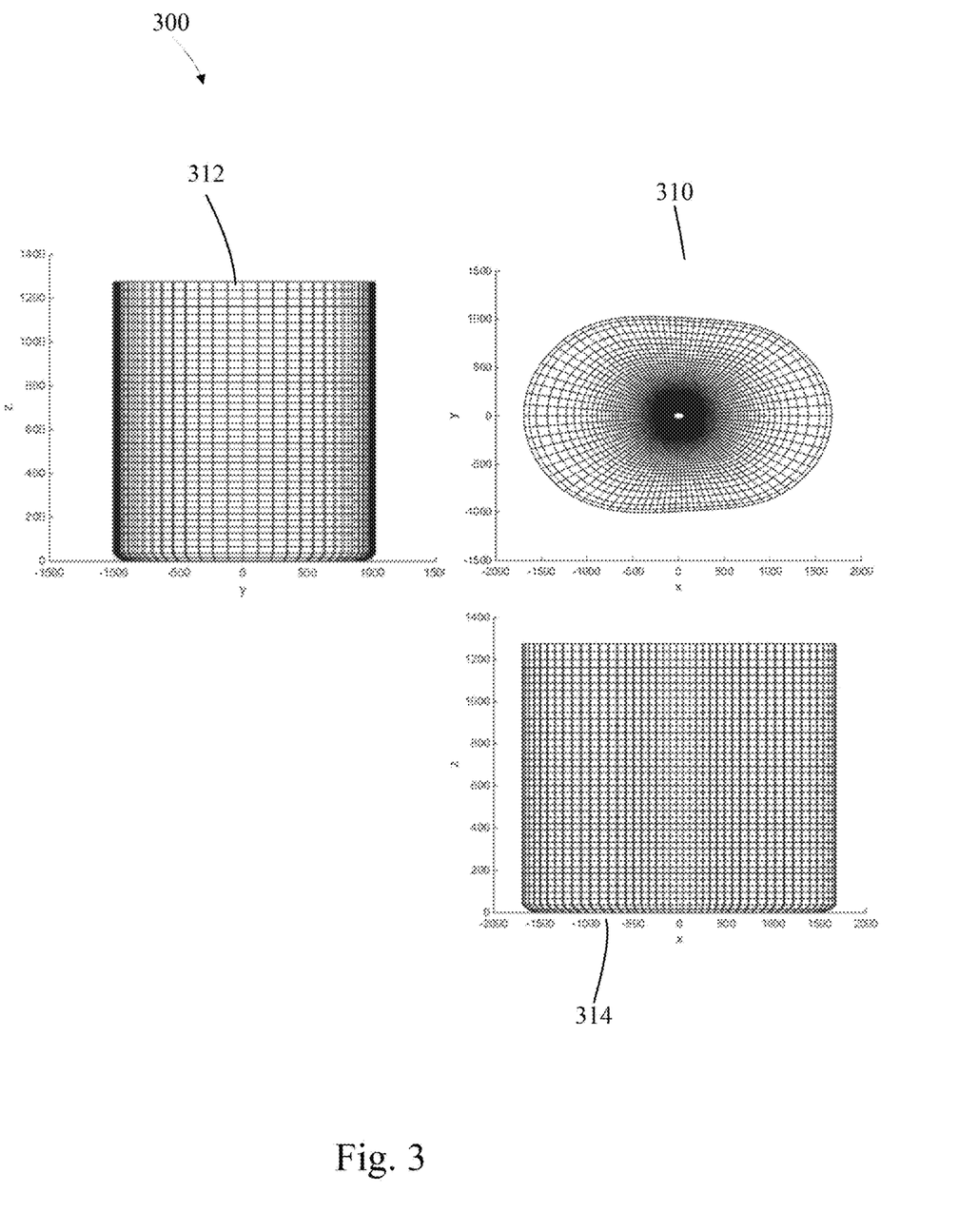
FIG. 3 is a three dimensional curve fit of imaging of the two dimensional radar curve fit in accordance with one embodiment of the disclosure.

FIG. 3 depicts 300 a three dimensional (3D) bowl mesh 310, 312 and 314 constructed based on the 2D curve 212 in FIG. 2. The radar distances, smoothed by the 2D curve fit 212 are then extended up from the ground to a predetermined height, i.e. the line 212 is extended into a 3D mesh 310, 312 and 314 forming a wall. This 3D extended wall will be the surface upon which the optical image from the optical sensors 126 will be mapped.

Figure 4:
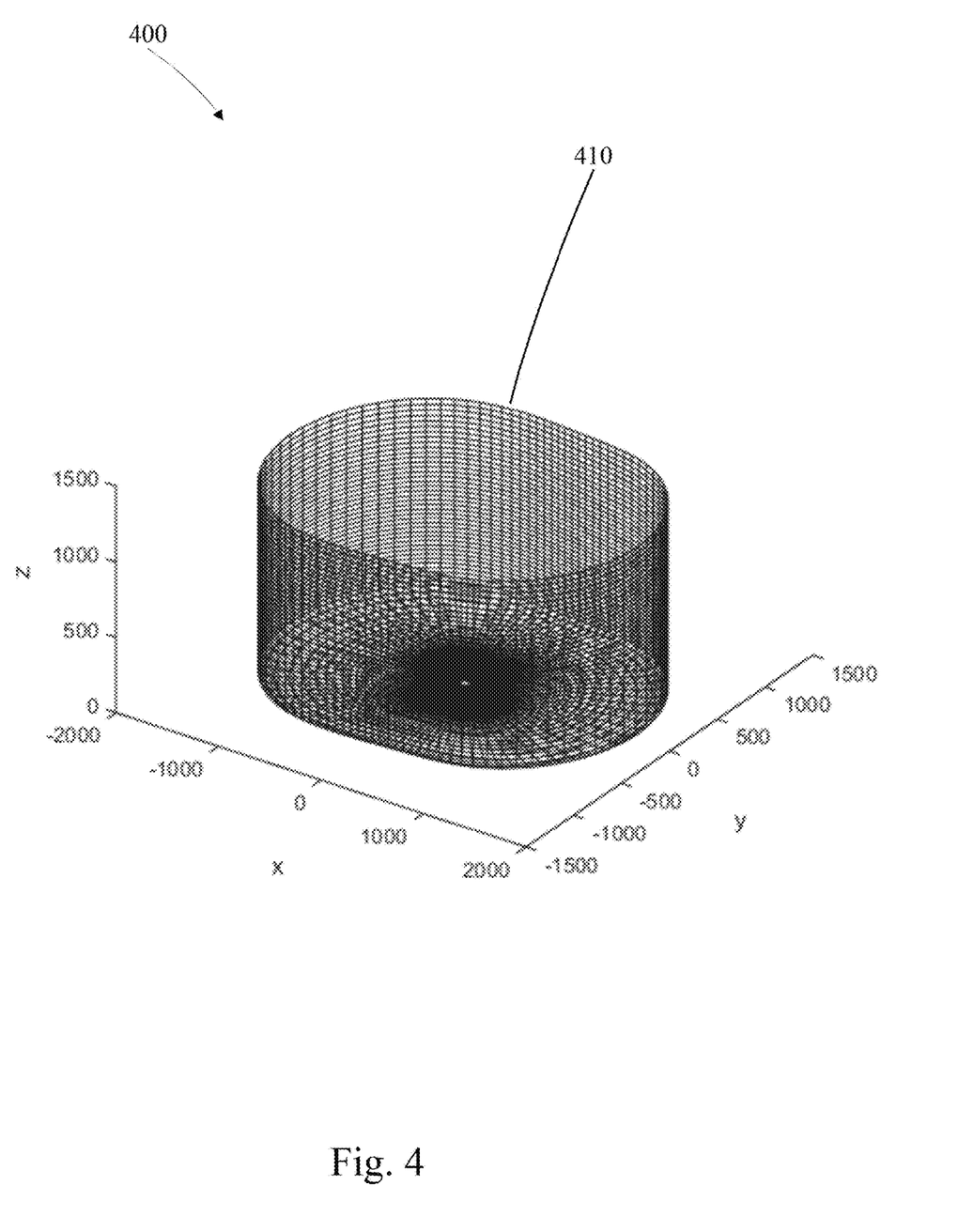
FIG. 4 is a three dimensional curve fit of imaging of the two dimensional radar curve fit in accordance with one embodiment of the disclosure.

FIG. 4 depicts an orthographic representation 400 of the three dimensional (3D) bowl mesh 410, FIG. 3 310, 312 and 314 constructed based on the 2D curve fit 212 of the radar data in FIG. 2.

To provide a complete 360 degree view of surroundings, multiple wide-angle cameras may be mounted around a vehicle, in the front, at the back, and at the sides. One possible method to aid an advanced driver assistance system (ADAS) may consist of multiple wide-angle cameras and radars mounted around the vehicle. Synthesis of wide-angle images into a 360 degree seamless surround view around the vehicle may be implemented as a 3D bowl surface model.

The bottom of the bowl may be the ground, which is flat and at its center the vehicle is located and around the vehicle are the walls of the bowl. Images may be captured by the cameras and projected onto the bowl model. The positions of three dimensional (3D) objects in real scene may not be consistent with that of the 3D bowl surface.

In the case where individual images are projected onto the bowl of the same object from different images that do not appear at the same location in the bowl surface due to parallax, this is referred to as ghost imaging. To reduce ghost imaging in the overlapping areas, one possible solution may be the inclusion of radar data to act as a stabilizer. One possible solution is to build the 3D bowl surface model based on the distance information detected by radar where the bottom of the bowl is the ground. Around the periphery of the vehicle is the wall of the bowl. The individual images from the optical sensors (cameras) are projected onto this 3D bowl surface (mesh). By finding a smooth path in the overlapping areas, the group of images are seamlessly stitched together to form a 3D ghost-free surround view.

One possible method to reduce ghosting is shown as follows.

(1) Receive sparse radar data around the vehicle. The radar data includes the direction and distance of surroundings to the vehicle at multiple directions.

(2) Fit a 2D curve-fitting on the radar data, this 2D curve encloses the vehicle and defines the position of the wall on the ground where the 3D mesh to be built on.

(3) Construct a 3D bowl surface mesh based on the 2D curve from radar data. The 2D curve serves as a contour of the 3D bowl in its cross-section plane.

(4) Project the optical images from different monocular cameras onto 3D mesh.

(5) In overlapping areas (on the mesh) between neighboring projected images, a seam is adaptively found through an area that lacks texture.

(6) Adjust the photometrics of projected images (projection) and blend around seams between neighboring projections for seamless stitching of the 3D surround view.

Figure 5:
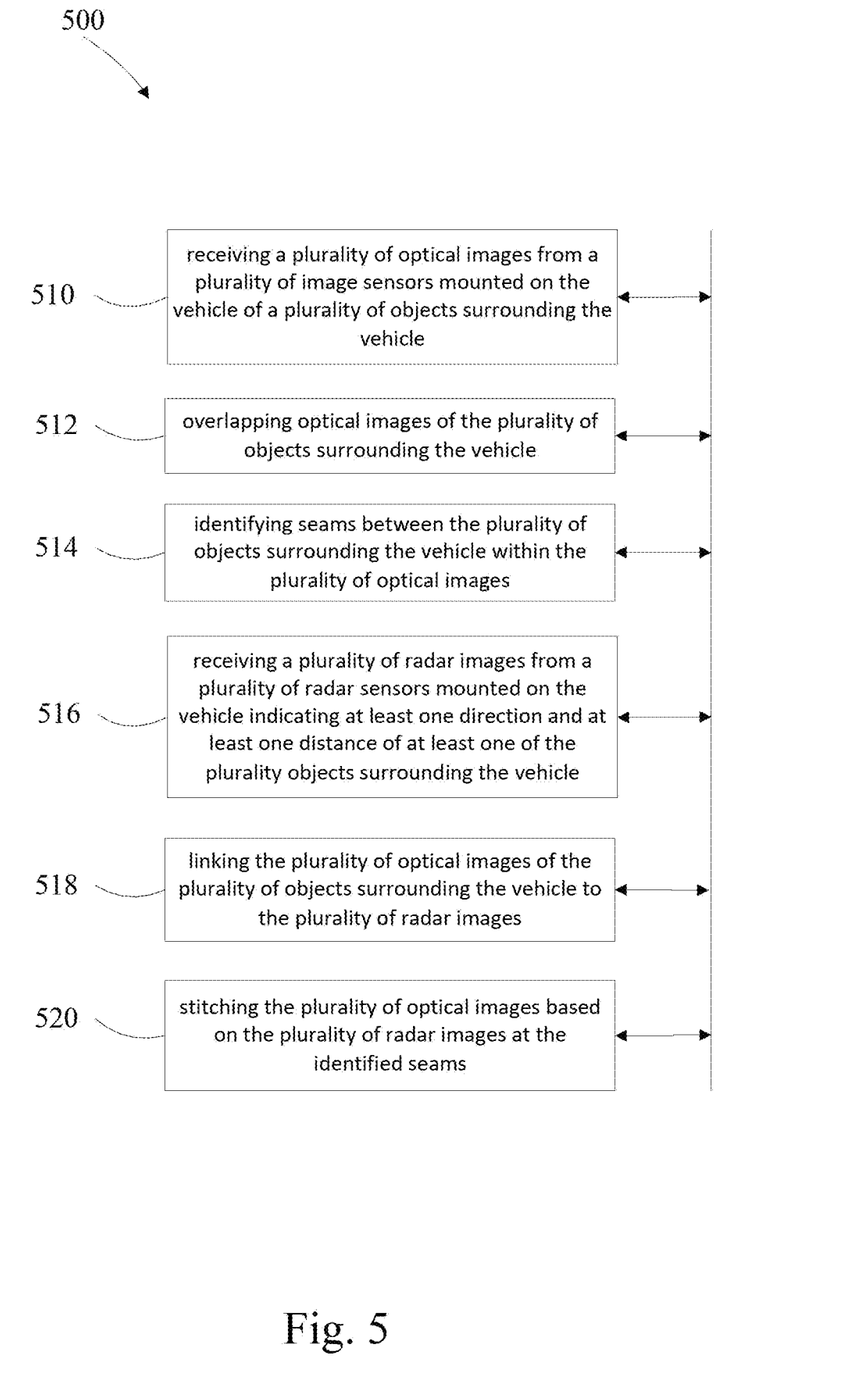
FIG. 5 is a first flow diagram in accordance with one embodiment of the disclosure.

FIG. 5 depicts a first example method of stitching panoramic optical images around a vehicle 500 including receiving 510 a plurality of optical images from a plurality of image sensors FIG. 1 126 mounted on the vehicle of a plurality of objects surrounding the vehicle. The method also includes overlapping 512 the optical images of the plurality of objects surrounding the vehicle to match the same image from different cameras and identifying its 514 seams between the plurality of objects surrounding the vehicle within the plurality of optical images. This identification of seams may be accomplished by finding areas of reduced texturing between objects. The method also includes receiving 516 a plurality of radar images from a plurality of radar sensors FIG. 1 128 mounted on the vehicle indicating at least one direction and at least one distance of at least one of the plurality objects surrounding the vehicle. At which point the method includes linking 518 the plurality of optical images of the plurality of objects surrounding the vehicle to the plurality of radar images and stitching 520 the plurality of optical images based on the plurality of radar images at the identified seams.

Figure 6:
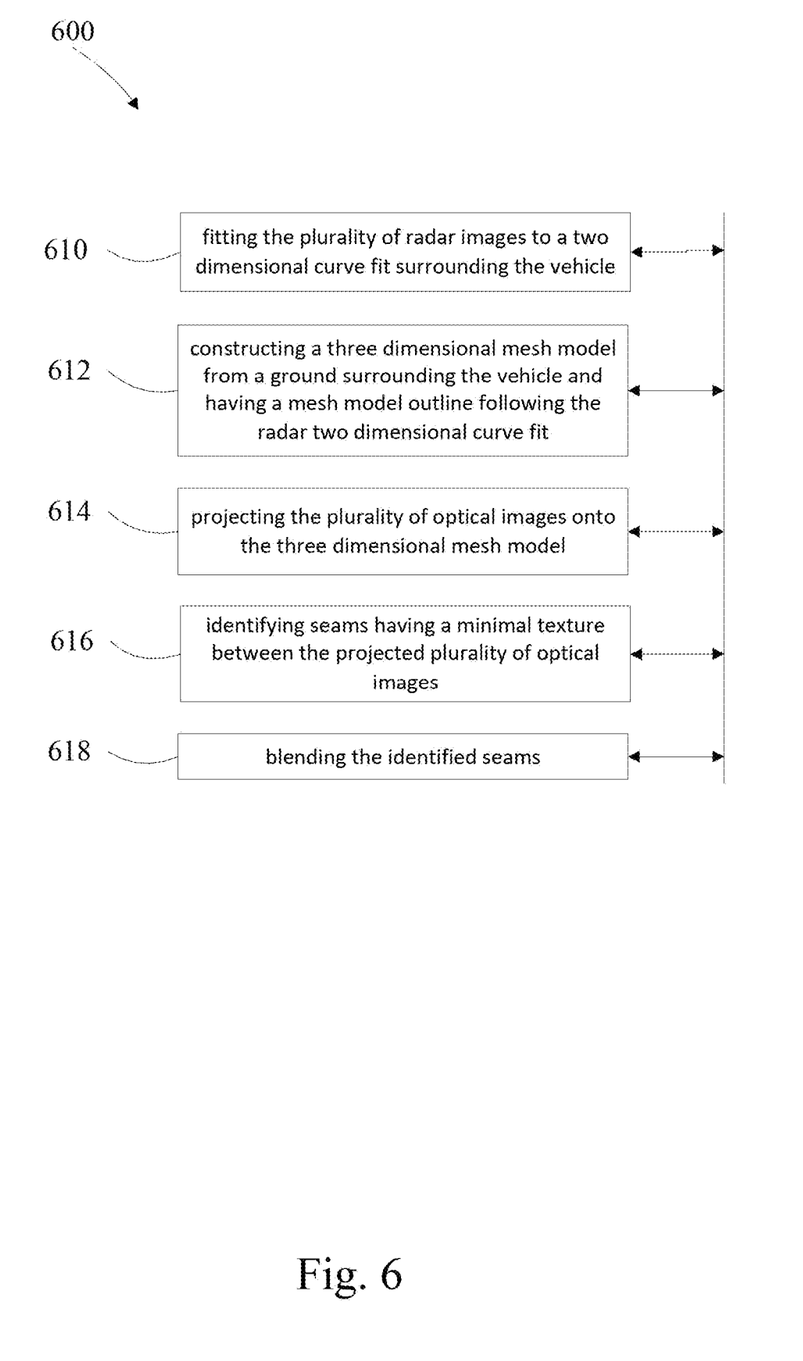
FIG. 6 is a second flow diagram in accordance with one embodiment of the disclosure.

FIG. 6 depicts a second example method 600 of stitching panoramic optical images around a vehicle comprising fitting 610 the plurality of radar images to a two dimensional curve fit surrounding the vehicle and constructing 612 a three dimensional mesh model from a ground surrounding the vehicle and having a mesh model outline following the radar two dimensional curve fit. The method may comprise optically projecting 614 the plurality of optical images onto the three dimensional mesh model and identifying 616 seams having a minimal texture between the projected plurality of optical images and blending 618 the identified seams. By linking the radar images before seam calculation and stitching provides better visual effects of the surrounding view of the vehicle.

Figure 7:
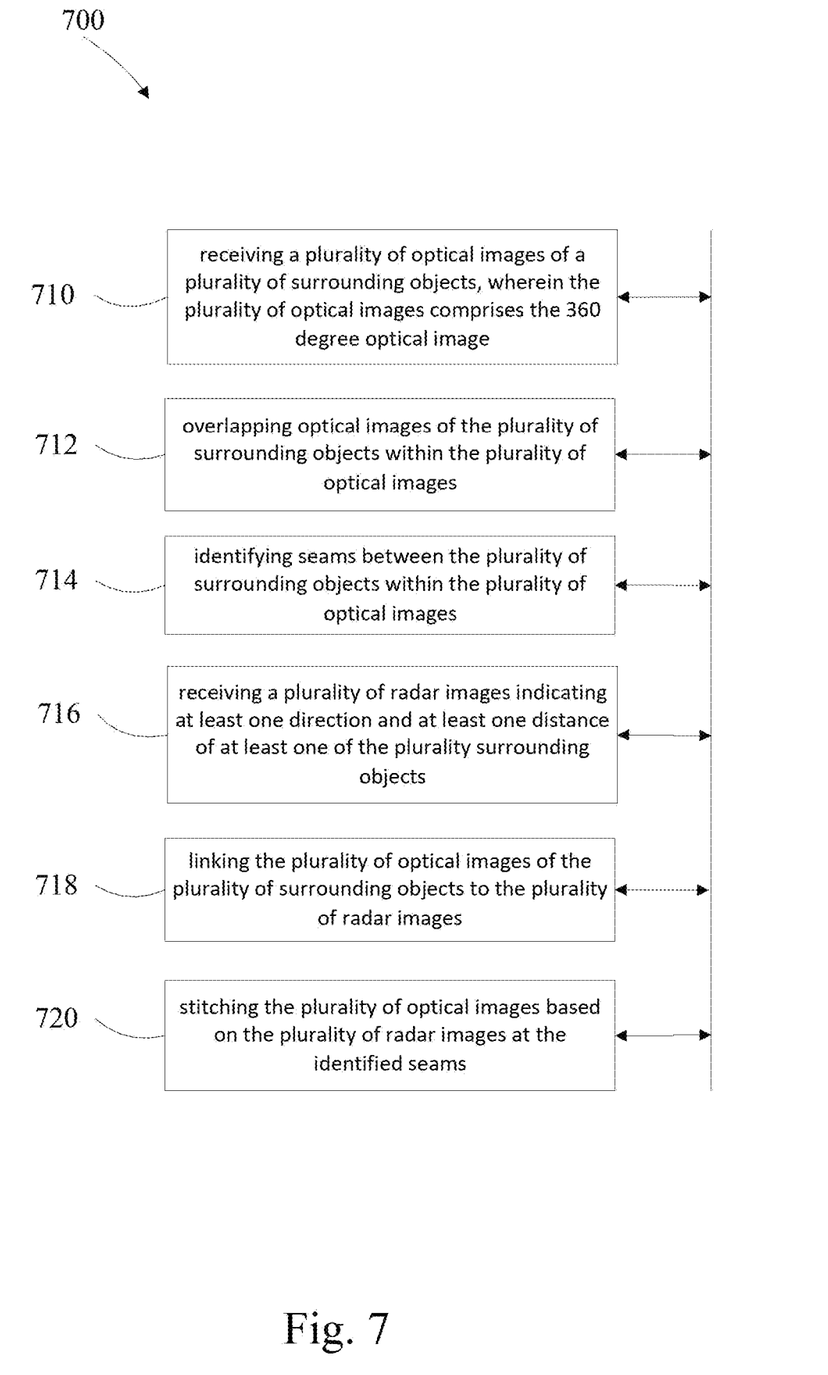
FIG. 7 is a third flow diagram in accordance with one embodiment of the disclosure.

FIG. 7 depicts a third example method 700 of stitching a 360 degree optical image including receiving 710 a plurality of optical images of a plurality of surrounding objects, wherein the plurality of optical images comprises the 360 degree optical image. The method also includes overlapping 712 optical images of the plurality of surrounding objects within the plurality of optical images and identifying 714 seams between the plurality of surrounding objects within the plurality of optical images. The method also includes receiving 716 a plurality of radar images indicating at least one direction and at least one distance of at least one of the plurality surrounding objects, linking 718 the plurality of optical images of the plurality of surrounding objects to the plurality of radar images and stitching 720 the plurality of optical images based on the plurality of radar images at the identified seams.

Figure 8:
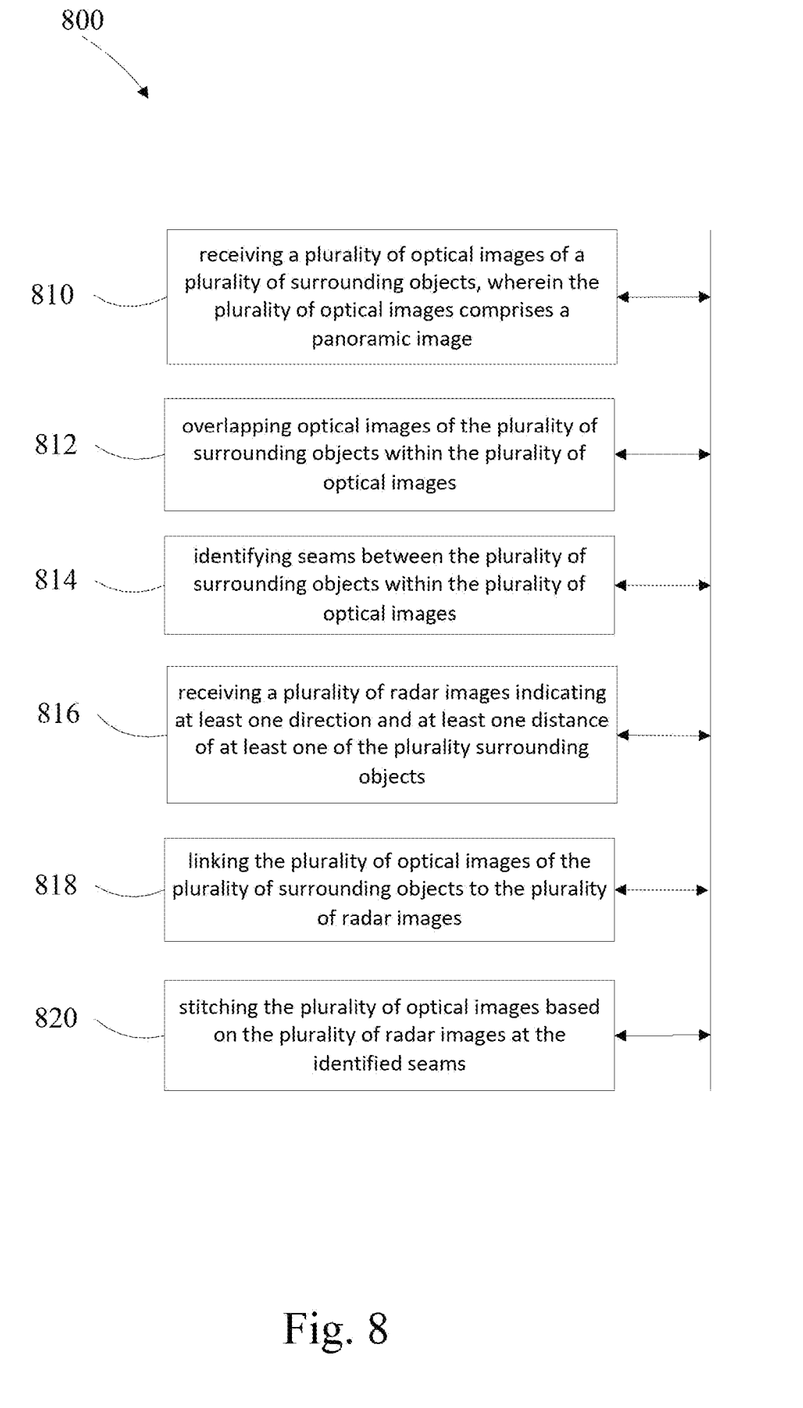
FIG. 8 is a fourth flow diagram in accordance with one embodiment of the disclosure.

FIG. 8 depicts a fourth example method 800 of stitching panoramic optical images including receiving 810 a plurality of optical images of a plurality of surrounding objects, wherein the plurality of optical images comprises a panoramic image. The method includes overlapping 812 the optical images of the plurality of surrounding objects within the plurality of optical images and identifying 814 seams between the plurality of surrounding objects within the plurality of optical images. The method also includes receiving 816 a plurality of radar images indicating at least one direction and at least one distance of at least one of the plurality surrounding objects, linking 818 the plurality of optical images of the plurality of surrounding objects to the plurality of radar images and stitching 820 the plurality of optical images based on the plurality of radar images at the identified seams.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more," Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may its refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed tinder the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of stitching panoramic optical images around a vehicle, comprising:
    receiving a plurality of optical images from a plurality of image sensors mounted on the vehicle of a plurality of objects surrounding the vehicle;
    receiving a plurality of radar images from a plurality of radar sensors mounted on the vehicle indicating at least one direction and at least one distance of at least one of the plurality objects surrounding the vehicle at a plurality of directions;
    fitting the plurality of radar images to a two dimensional curve fit surrounding the vehicle;
    linking the plurality of optical images of the plurality of objects surrounding the vehicle to the plurality of radar images;
    overlapping optical images of the plurality of objects surrounding the vehicle;
    identifying seams between the plurality of objects surrounding the vehicle within the plurality of optical images, wherein the seams are placed through areas lacking texture; and
    stitching the plurality of optical images based on the plurality of radar images at the seams.

2. The method of stitching panoramic optical images of claim 1, wherein the stitching removes redundant optical images.

3. The method of stitching panoramic optical images of claim 1, further comprising constructing a three dimensional mesh model from a ground surrounding the vehicle and having a mesh model outline following the radar two dimensional curve fit.

4. The method of stitching panoramic optical images of claim 1, further comprising constructing a three dimensional mesh model from a around surrounding the vehicle and having a mesh model contour following the radar two dimensional curve fit.

5. The method of stitching panoramic optical images of claim 3, further comprising projecting the plurality of optical images onto the three dimensional mesh model.

6. The method of stitching panoramic optical images of claim 5, further comprising identifying seams having a minimal texture between the projected plurality of optical images.

7. The method of stitching panoramic optical images of claim 5, further comprising blending the identified seams.

8. A method of stitching a 360 degree optical image, comprising:
   receiving a plurality of optical images of a plurality of surrounding objects, wherein the plurality of optical images comprises the 360 degree optical image;
   receiving a plurality of radar images indicating at least one direction and at least one distance of at least one of the plurality surrounding objects at a plurality of directions;
   fitting the plurality of radar images to a two dimensional curve fit surrounding the vehicle;
   linking the plurality of optical images of the plurality of surrounding objects to the plurality of radar images;
   overlapping optical images of the plurality of surrounding objects within the plurality of optical images;
   identifying seams between the plurality of surrounding objects within the plurality of optical images, wherein the seams are placed through areas lacking texture; and
   stitching the plurality of optical images based on the plurality of radar images at the seams.

9. The method of stitching the 360 degree optical image of claim 8, further comprising constructing a three dimensional mesh model from a ground level and having a mesh model outline following the radar two dimensional curve fit.

10. The method of stitching the 360 degree optical image of claim 9, further comprising projecting the plurality of optical images onto the three dimensional mesh model.

11. The method of stitching the 360 degree optical image of claim 10, further comprising identifying seams having a minimal texture between the projected plurality of optical images.

12. The method of stitching the 360 degree optical image of claim 11, further comprising blending the identified seams.

13. A method of stitching panoramic optical images, comprising:
   receiving a plurality of optical images of a plurality of surrounding objects, wherein the plurality of optical images comprises a panoramic image;
   overlapping optical images of the plurality of surrounding objects within the plurality of optical images;
   identifying seams between the plurality of surrounding objects within the plurality of optical images, wherein the seams are placed through areas lacking texture;
   receiving a plurality of radar images indicating at least one direction and at least one distance of at least one of the plurality surrounding objects at a plurality of directions;
   fitting the plurality of radar images to a two dimensional curve fit surrounding the vehicle;
   linking the plurality of optical images of the plurality of surrounding objects to the plurality of radar images; and
   stitching the plurality of optical images based on the plurality of radar images at the seams.

14. The method of stitching panoramic optical images of claim 13, further comprising:
   fitting plurality of radar images is a two dimensional curve fit of the plurality of surrounding objects;
   constructing a three dimensional mesh model from a ground level and having a mesh model outline following the radar two dimensional curve fit; and
   projecting the plurality of optical images onto the three dimensional mesh model.

15. The method of stitching panoramic optical images of claim 14, further comprising:
   identifying seams having a minimal texture between the projected plurality of optical images; and
   blending the identified seams.

* * * * *